United States Patent
Modzelewski et al.

(10) Patent No.: US 9,063,909 B2
(45) Date of Patent: Jun. 23, 2015

(54) ISOLATING DATA STORAGE MIRRORING OPERATIONS

(71) Applicant: Dropbox, Inc., San Francisco, CA (US)

(72) Inventors: Kevin Modzelewski, San Francisco, CA (US); Akhil Gupta, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 286 days.

(21) Appl. No.: 13/722,906

(22) Filed: Dec. 20, 2012

(65) Prior Publication Data

US 2014/0181436 A1    Jun. 26, 2014

(51) Int. Cl.
*G06F 12/16* (2006.01)
*G06F 11/20* (2006.01)

(52) U.S. Cl.
CPC ........ *G06F 11/2087* (2013.01); *G06F 11/2082* (2013.01)

(58) Field of Classification Search
CPC .. G06F 11/2087; G06F 11/2082; G06F 12/16
USPC .................. 711/162, 156, 169; 707/655, 659
See application file for complete search history.

(56) References Cited

U.S. PATENT DOCUMENTS

| | | | |
|---|---|---|---|
| 6,157,991 A * | 12/2000 | Arnon | 711/161 |
| 6,467,034 B1 * | 10/2002 | Yanaka | 711/162 |
| 6,594,745 B2 * | 7/2003 | Grover | 711/162 |
| 7,120,824 B2 * | 10/2006 | Burton et al. | 714/6.23 |
| 7,143,250 B1 * | 11/2006 | Riedl | 711/162 |
| 7,188,222 B2 * | 3/2007 | Micka et al. | 711/162 |
| 7,254,683 B2 * | 8/2007 | Burton et al. | 711/162 |
| 7,325,109 B1 * | 1/2008 | Muppalaneni et al. | 711/162 |
| 7,730,257 B2 * | 6/2010 | Franklin | 711/114 |
| 7,734,883 B2 * | 6/2010 | Spear et al. | 711/162 |
| 7,949,836 B2 * | 5/2011 | Hillier et al. | 711/150 |
| 8,683,167 B1 * | 3/2014 | Clark et al. | 711/167 |
| 2002/0103968 A1 * | 8/2002 | Grover | 711/114 |
| 2004/0236983 A1 * | 11/2004 | Burton et al. | 714/6 |

* cited by examiner

*Primary Examiner* — Stephen Elmore
(74) *Attorney, Agent, or Firm* — Novak Druce Connolly Bove + Quigg$^{LLP}$ (57) ABSTRACT

Systems, methods, and computer-readable storage media for isolating mirroring operations when interacting with a data storage space, and more specifically to directing data to be stored in two locations, where storing the data in the second location does not slow or impede storing the data in the first location. Upon receiving a request to store data, the system can determine a first storage space and a second storage space in which to store the data. Instructions can be prepared for storing the data in the first storage space while at the same time preparing instructions for storing identical data in the second storage space. The system can communicate the instructions to both storage systems, with the first storage space immediately beginning the storage process while the second storage space places the instructions into a queue for later processing.

20 Claims, 5 Drawing Sheets

FIG. 4B

ISOLATING DATA STORAGE MIRRORING OPERATIONS

TECHNICAL FIELD

The present disclosure relates to isolating mirroring operations when interacting with a data storage space, and more specifically to directing data to be stored in two locations, where storing the data in the second location does not slow or impede storing the data in the first location.

BACKGROUND

When storing data, it is often desirable to have the data stored in multiple locations. Multiple storage locations can help ensure accessibility should one or more of the locations become unavailable, and can, in some cases, provide for increased customization in how the data is stored and/or retrieved. However, storing the data at multiple locations, whether those locations are physically distinct or are co-located partitions of a single data storage device, often leads to delays in both storage and retrieval of data. These delays often originate in the duplication of instructions and/or data for each location. While for relatively small data sizes these duplication delays may be negligible to a given user, as the size of the data increases any duplication delay in storing or retrieving data can result in delays that can be detected by the user.

With cloud computing and network based storage services, these delays can impact customer perceptions of the service. A network based storage service allows users to store, access, and manipulate data on databases and servers maintained across a network, thereby freeing customers from being concerned with the physical location of the storage of the data while giving them near instantaneous access to the data from virtually any network access point. However, customers using network based storage services generally want access to their data to be near instantaneous, and not delayed or slow. When customers begin to experience substantial delays in storing and retrieving data, customer confidence and satisfaction wanes.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out hereinafter. These and other features of the disclosure will become more fully apparent from the following description and accompanying drawings, or can be learned by the practice of the principles set forth herein.

Disclosed are systems, methods, and non-transitory computer-readable storage media for isolating mirroring operations when interacting with a data storage space, and more specifically to directing data to be stored in two locations, where storing the data in the second location does not slow or impede storing the data in the first location. As a system configured according to this disclosure receives a request to store data, the system can determine a first storage space and a second storage space in which to store the data, where both the first and second storage spaces store identical versions of the data. The system can prepare instructions for storing the data in the first storage space while at the same time preparing instructions for storing identical data in the second storage space.

While the instructions for the first storage space immediately begin the storage of the data upon being communicated to the first storage space, the second set of instructions may or may not immediately initiate data storage in the second storage space. Instead, the second set of instructions can be sent to a queue of instructions associated with the second storage space. Not until the queue for the second storage space reaches the newly added second set of instructions will the storage process begin. The queue can be executed by a background process or a completely separate computing device so that execution of the queue does not impact or slow down accesses to the first storage space. This approach can be useful when mirroring between a primary or 'production' storage space (the first storage space) and a backup or migration storage space (the second storage space). The system can perform file operations to populate the backup or migration storage space on an as-accessed basis so that the migration is performed incrementally over time rather than taking the entire service offline during a migration period, which may be undesirable or impossible for a network based storage service.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

A system, method and computer-readable media are disclosed which can isolate mirroring operations when interacting with multiple data storage spaces. These mirroring operations duplicate data across the data storage spaces, resulting in multiple copies of identical pieces of data. As an example, an organization may use a storage service or architecture, such as an online storage service or network attached storage (NAS), initially for data storage needs. However, as the organization grows or as usage patterns change, the organization may determine that the data stored in the initial location should be migrated to another storage solution. For example, a company may initially select to use an online storage provider, and later decide to migrate away from the online storage provider to locally hosted storage rather than renting space from the online storage provider. Such a migration can be for an entire dataset stored at the online storage provider or for a portion of the dataset.

One option for migrating the data to locally hosted storage is to purchase all of the storage devices and infrastructure necessary to copy the data hosted by the online storage provider. This option may not be optimal because purchasing all of the needed infrastructure and storage devices can be expensive, and depending on the amount of data, the bandwidth required to copy the data can be prohibitively large, preventing or slowing file operations or other interactions with the online storage provider during the transition.

Systems configured according to this disclosure can provide a second option for transferring or migrating data from an online storage provider to another location. Rather than performing a one-time transfer of all the data, the system can, upon receiving a command to store, access, or modify data, store the data both in the online storage provider and in another location, such as locally hosted storage. To avoid delays in servicing primary or 'production' requests for data hosted by the online storage provider, the system can generate two sets of instructions—one for the online storage provider and one for the new location. The system can communicate with the online storage provider in the same manner as if no mirroring or migration operation were performed, and initiate storage of the data or whatever other file operation is requested.

The system can also generate instructions for the new storage location. However instead of initiating the file operation at the new storage location immediately, the system can add to a queue the instructions for the file operation at the new location. The queue can hold instructions for the new storage location, and particularly instructions for the timing of storage of data at the new location. The queue can enable storage at the new storage location to occur as processing bandwidth allows. Alternatively, the system can execute the file operation at the new storage location so that performance of executing the file operation at the online storage provider is not negatively impacted, such as performing the file operation at the new storage location in a background thread or process, or assigning execution of the file operation at the new storage location to a separate computing device, separate computing core, or different virtual machine.

When requests for data are received, the system can determine if the data has been migrated to the new storage location, or is only located at the online storage provider. If the data has been duplicated or migrated, then the system can retrieve the data from the new storage location or the online storage provider. For example, under high load conditions, such as when more than a threshold amount of file operation requests are being processed, the system can route all or a certain percentage of file operations to the new storage location when available. This can alleviate load on the online storage provider and may increase responsiveness for data that is already migrated. If the data is not yet migrated, the system can request the data from the online storage provider. The system can intercept requests for data from the online storage provider and use that data, which is already passing through the system from the online storage provider to a client, to mirror to the new storage location.

As this example suggests, the system can migrate data from the online storage provider to the new storage location upon receiving requests for different types of file operations, such as a copy, move, delete, rename, create, or read. When the system intercepts file operations that alter the file contents, such as a copy, move, delete, rename, or create, the system can prioritize those types of operations in a file operation queue over non-altering file operations such as using data received from a read. Therefore, files or pieces of files that are modified can be migrated before those that are simply read.

While the previous example describes a system configured according to this disclosure interacting with the new storage location and with an online storage provider, other configurations could be specific to an individual seeking to transfer data between two locally attached hard drives. Rather than performing a single transfer of all the data, the system can slowly begin to add new information to the second (new) hard drive while still accessing the previous hard drive. In such an example, the system could have a threshold value defined which, when reached, indicates that the majority of the information being actively used is now on the new hard drive and initiating copying of the remaining information from the old hard drive. The threshold can be any value set by the system or a user. Such a 'clean-up' migration effort can be performed in the background so as not to interfere with performance of serving file operations. In one variation, the system can maintain a database of which files have been mirrored or migrated to the new storage location and which files have not.

Figure 1:
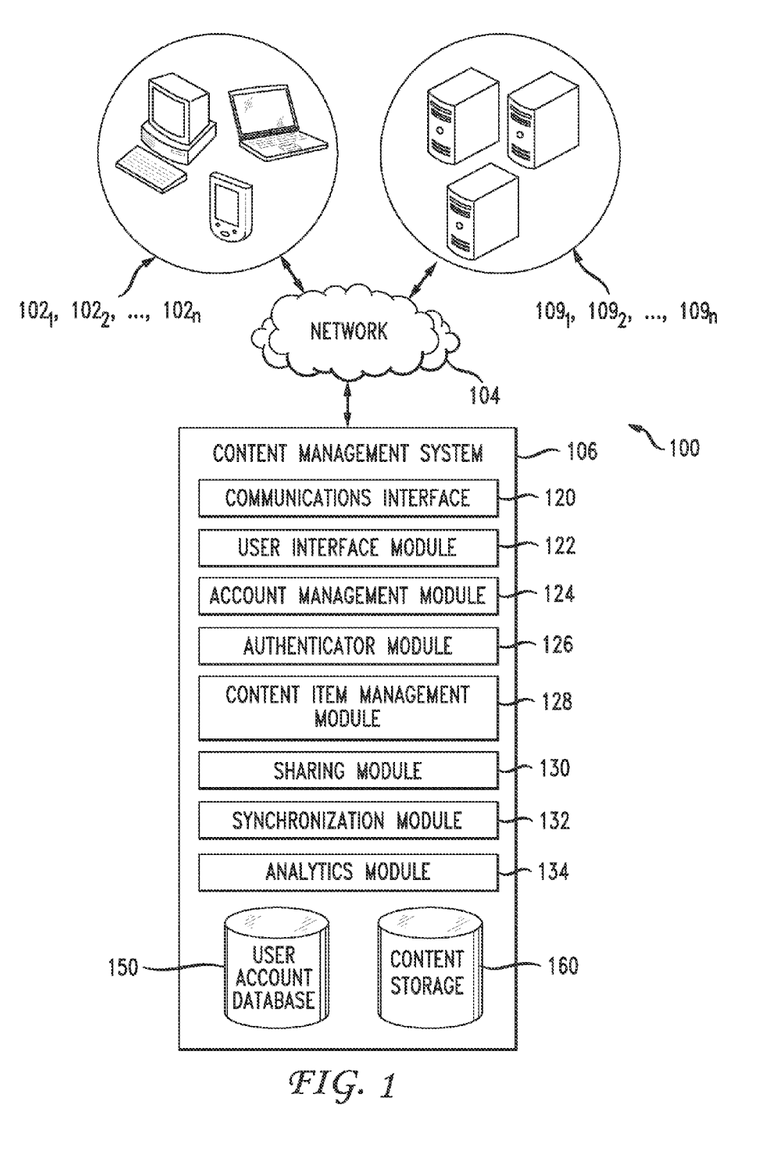
FIG. 1 shows an exemplary configuration of devices and a network in accordance with the invention.

An exemplary system configuration 100 is shown in FIG. 1, wherein electronic devices communicate via a network for purposes of exchanging content and other data. System 100 can be configured for use on a wide area network such as that shown in FIG. 1. However, the present principles are applicable to a wide variety of network configurations that facilitate the intercommunication of electronic devices, such as a local area network, wireless network, etc. For example, each of the components of system 100 in FIG. 1 can be implemented in a localized or distributed fashion in a network.

In system 100, a user can interact with content management system 106 through client devices $102_1, 102_2, \ldots, 102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device 102, or some other client device 102.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of independent disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include a content management module 128 for maintaining a content directory. The content directory can identify the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
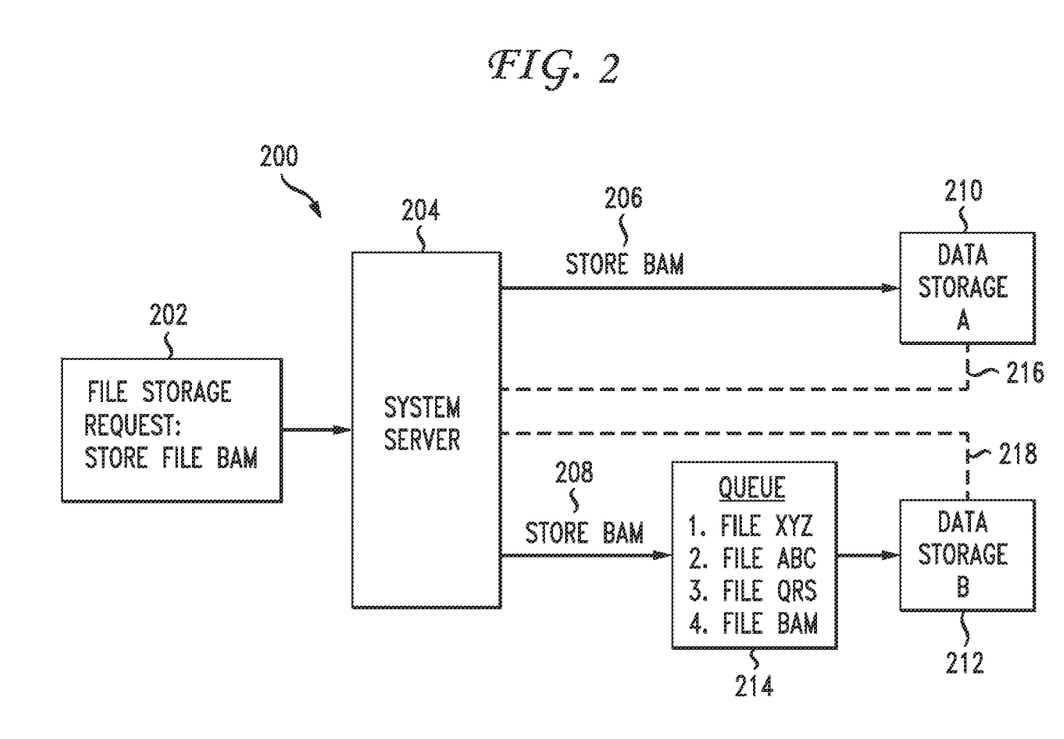
FIG. 2 shows an example of a system interactions.

Having disclosed some system components, the disclosure now turns to FIG. 2, which shows example system interactions 200. In this example, system server 204, which can be content management system 106, can receive file storage request 202. Storage request 202 can contain a back-end instruction indicating to store a file named 'BAM' in an online storage space used in the content management system 106, such as content storage 160.

System server 204 can prepare two sets of instructions simultaneously or in short succession: one set of instructions to go to the "old" or previous data storage space, shown as "Data Storage A" 210, and one set of instructions to go to the "new" data storage space, shown as "Data Storage B" 212. System server 204 can then send both sets of instructions, with instructions 206 to data storage A 210 being directly received by data storage A 210. Upon receiving storage instructions 206, data storage A 210 can immediately begin the process of storing the data. This storage process can occur using the same pathway (and bandwidth) as storage instruction 206, or can occur using different pathways and bandwidth 216.

Storage instructions 208 for data storage B 212, rather than being directly received by data storage B, can instead be directed to queue 214. Queue 214 can store storage instructions for data storage B 212 until data storage B is ready to store additional data. Factors which could restrict data storage B's ability to store data are remaining data space, bandwidth, conflicting instructions, formatting errors, timing errors, or server maintenance. Queue 214 can also store various other types of instructions in addition to instructions to store files. For example, while data storage B 212 can have separate pathways 218 for communicating data to and from system server 204, these pathways 218 may have bandwidth limitations necessitating the use of queue 214. In addition, the instructions in queue 214 can be processed based on a first-in-first-out (FIFO) sequence, predicted duration, number of interactions, required movements of other stored data, priority, type of operation, urgency for keeping data current and consistent, and so forth. In certain instances the instructions can wait in queue 214 until sufficient CPU cycles become available. In order to maintain a desired level of consistency between data storage A 210 and data storage B 212, the system can implement a priority queue where the longer an item remains in the queue the higher its priority.

After the instructions in queue 214 are performed, data storage A 210 and data storage B 212 should both contain the new file BAM. Certain configurations will have thresholds to ensure balance between data storage A 210 and data storage B 212. These thresholds can look to the number of stored instructions in queue 214, the predicted time associated with these or other instructions, the size of data being transferred, and other interactions between system server 204 and data storage units 210 and 212.

Many configurations may not seek to immediately transfer all the data stored in data storage A 210 to data storage B 212. Reasons for this can include a desire to perform a soft transfer of files, thereby not impeding user interactions, different storage formats between data storage devices 210 and 212, that data storage A 210 is significantly larger than data storage B 212, or that data storage A 210 is owned by a separate entity than data storage B 212. This separate entity could charge by bandwidth communicated, making unnecessary communications less cost effective. In such configurations, the balance can be determined based on the number of files starting at a given time or date. System server 204 can mirror or migrate all files hosted at data storage 210 or a subset thereof. For instance, system server 204 can mirror file operations only for files residing in a particular range or type of user accounts. System server 204 can mirror file operations for files having a specific file type, within a range of file sizes, or some other criteria.

An entity that originates file storage request 202 can be aware of the relationship between data storage device 210 and 212, or can be oblivious to the relationship. Examples of entities originating the file request include human users, user devices, terminals, computers, and processors. Such entities can then request retrieval of data from system server 204. System server 204 can determine if the data is stored only in data storage device A 210, or if the data is stored both in data storage devices A 210 and B 212. If the data is stored in both A 210 and B 212, system server 204 can send a request only to data storage device B 212 for the data. In this case, no request is made to data storage device A 210 unless an error or other problem is found to exist with data storage B 212.

Figure 3:
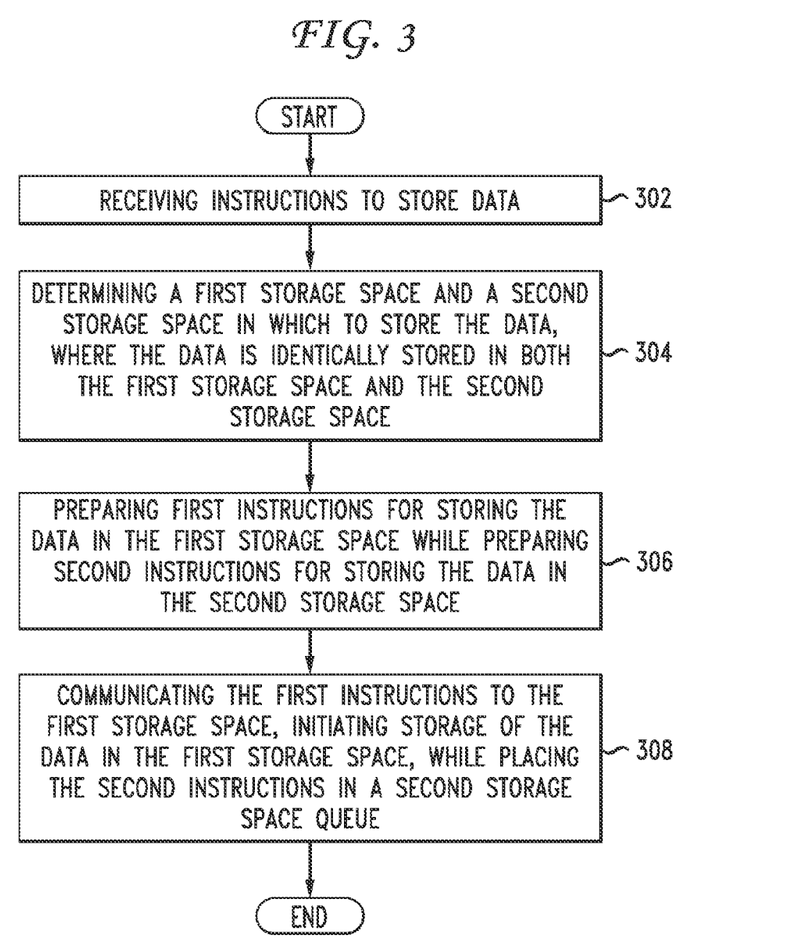
FIG. 3 shows an example method embodiment.

Having disclosed some basic system components and concepts, the disclosure now turns to the exemplary method embodiment shown in FIG. 3. For the sake of clarity, the method is described in terms of content management system 106 as shown in FIG. 1 configured to practice the method. The steps outlined herein are exemplary and can be implemented in any combination thereof, including combinations that exclude, add, or modify certain steps.

Content management system 106 can first receive instructions to store data (302). While this data can be in any acceptable format, often the data will take the form of a document, picture, web address, or other file format. Content management system 106 can make a determination as to whether the data needs to be mirrored, or copied, to two separate storage spaces. If so, the content management system 106 can determine a first storage space and a second storage space in which to store the data, where the data is identically stored in both the first storage space and the second storage space (304). The first and second storage spaces can be partitions in a single storage device, an array of storage devices, individual or multiple hard drives, servers, databases, or cloud computing configurations. In certain configurations, the first storage device can have a larger capacity than the second storage device. Other variations that can exist between the two storage devices can include the communications bandwidth available, the relative CPU processing power associated with each device, the format in which the data is stored, the format for receiving the instructions, the relative cost of using each storage device, power consumption, and ownership of the storage devices. In addition, the entity that originated the instructions to store the data can be aware that the data will be stored in both the first and second storage spaces, or can be unaware of that fact.

Having determined the first storage space and the second storage space, content management system 106 can prepare first instructions for storing the data in the first storage space and preparing second instructions for storing the data in the second storage space (306). Content management system 106 can then communicate the first instructions to the first storage space, initiating storage of the data in the first storage space, while placing the second instructions in a second storage space queue (308). This queue can be executed sequentially, in a first-in-first-out manner, or can be executed based on the predicted time of the storage, CPU cycles, and data to be stored. In addition, the queue can be processed to comply with thresholds that maintain a synchronization between the first and second storage spaces. Exemplary thresholds can be a certain amount of time between when the instructions were sent to the respective storage spaces, a particular amount of data, or a number of files not yet stored on both storage devices.

Having stored the data per the instructions in the queue, content management system 106 can receive a request to retrieve the data. When content management system 106 receives a retrieval request, content management system 106 can determine if the data is stored in the second storage space or only in the first storage space. If the data is stored in the second storage space, the data is obtained from the second storage space and then communicated to the requesting entity.

Figure 4A:
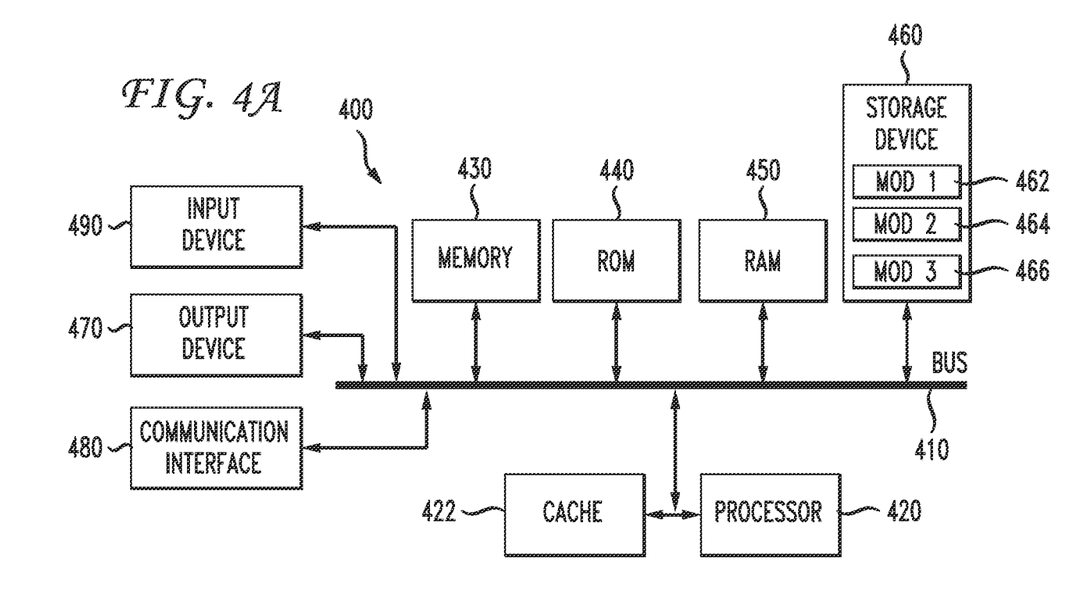
FIG. 4A shows a conventional system bus computing system architecture.
Figure 4B:
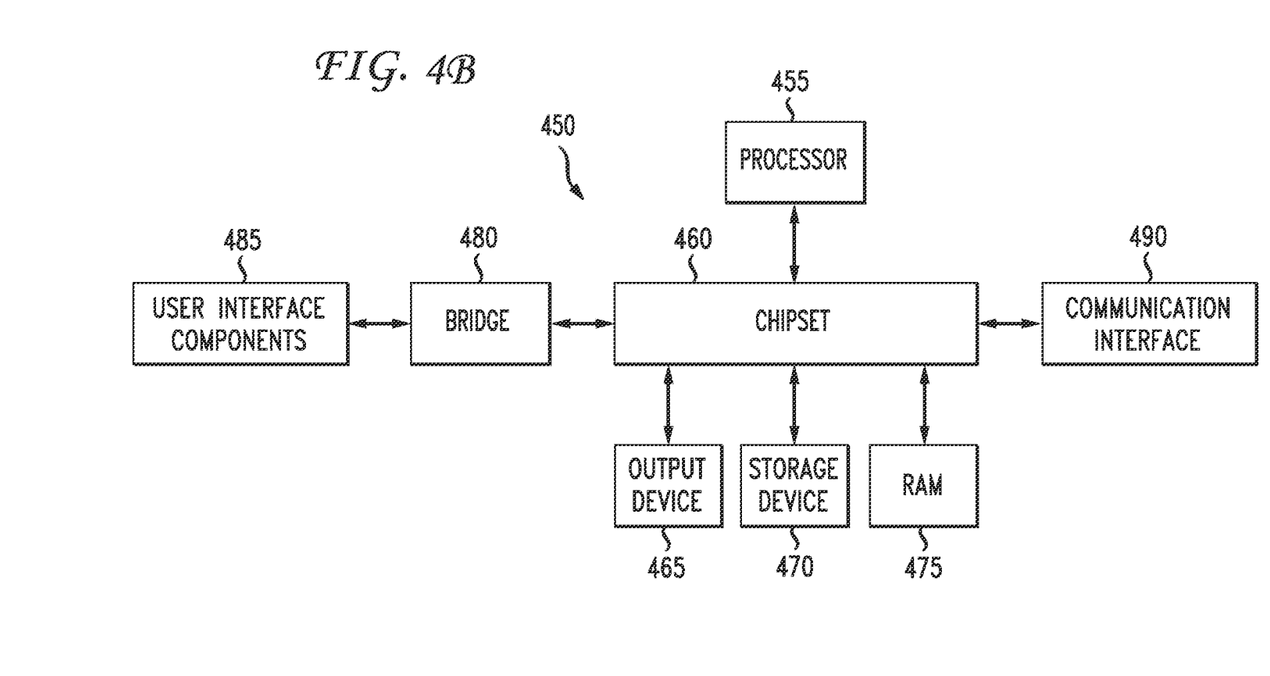
FIG. 4B shows a computer system having a chipset architecture.

FIG. 4A, and FIG. 4B show exemplary possible system embodiments. The more appropriate embodiment will be apparent to those of ordinary skill in the art when practicing the present technology. Persons of ordinary skill in the art will also readily appreciate that other system embodiments are possible.

FIG. 4A shows a conventional system bus computing system architecture 400 wherein the components of the system are in electrical communication with each other using a bus 405. Exemplary system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware module or software module, such as module 1 462, module 2 464, and module 3 466 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 462, 464, 466 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B shows a computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 470, which can include magnetic media, and solid state media, for example. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or 475. Further, the machine can receive inputs from a user via user interface components 485 and execute appropriate functions, such as browsing functions by interpreting these inputs using processor 455.

It can be appreciated that exemplary systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A computer-implemented method comprising:
receiving, by a processor, instructions to store data in a first storage space, which data is to be mirrored to a second storage space;
preparing, by a processor, first instructions for storing the data in the first storage space, and second instructions for also storing the data in the second storage space;
communicating, by a processor, the first instructions to the first storage space to initiate storage of the data in the first storage space; and
communicating, by a processor, the second instructions to a queue to be executed for storing the data in the second storage space at a subsequent time upon a predefined condition being met.

2. The method of claim 1, wherein the queue comprises a list of data storage instructions which are processed in sequence.

3. The method of claim 1, further comprising:
receiving, from a requestor, a retrieval request to retrieve the data;
determining that the data is stored in the second storage space; and
responding to the retrieval request by: obtaining the data from the second storage space; and communicating the data to the requestor.

4. The method of claim 1, wherein the first storage space has a higher storage capacity than the second storage space.

5. The method of claim 1, wherein the first storage space is owned by a different entity than the second storage space.

6. The method of claim 1, wherein the first storage space packages the data for storage in a different format from the second storage space.

7. The method of claim 1, wherein storage of the data in the first storage space and the second storage space is not disclosed to an entity which sent the instructions.

8. The method of claim 1, further comprising only performing the determining, preparing, and communicating after determining that mirroring of the data needs to be performed.

9. The method of claim 1, wherein the second instructions are processed upon meeting a threshold.

10. A non-transitory computer-readable storage medium having processor-executable instructions stored therein for causing a processor to:
receive instructions to store data in a first storage space, which data is to be mirrored to a second storage space;
prepare first instructions for storing the data in the first storage space, and second instructions for also storing the data in the second storage space;
communicate the first instructions to the first storage space to initiate storage of the data in the first storage space; and
communicate the second instructions to a queue to be executed for storing the data in the second storage space at a subsequent time upon a predefined condition being met.

11. The non-transitory computer-readable storage medium of claim 10, wherein the second storage space queue comprises a list of data storage instructions which are processed in sequence.

12. The non-transitory computer-readable storage medium of claim 10, the computer-readable storage medium having additional instructions stored therein for causing a processor to:
receive, from a requestor, a retrieval request to retrieve the data;
determine that the data is stored in the second storage space; and
respond to the retrieval request by:
obtaining the data from the second storage space; and
communicating the data to the requestor.

13. The non-transitory computer-readable storage medium of claim 10, wherein the first storage space has a higher storage capacity than the second storage space.

14. The non-transitory computer-readable storage medium of claim 10, wherein the first storage space is owned by a different entity than the second storage space.

15. The non-transitory computer-readable storage medium of claim 10, wherein the first storage space packages the data for storage in a different format from the second storage space.

16. The non-transitory computer-readable storage medium of claim 10, wherein storage of the data in the first storage space and the second storage space is not disclosed to an entity which sent the instructions.

17. The non-transitory computer-readable storage medium of claim 10, the computer-readable storage medium having additional instructions stored which result in the method further comprising only performing the determining, preparing, and communicating after determining that mirroring of the data needs to be performed.

18. The non-transitory computer-readable storage medium of claim 10, wherein the second instructions are processed upon meeting a threshold.

19. A system comprising:
a processor; and
a non-transitory computer-readable storage medium having processor-executable instructions stored therein for causing a processor to:
receive instructions to store data in a first storage space, which data is to be mirrored to a second storage space;
prepare first instructions for storing the data in the first storage space, and second instructions for also storing the data in the second storage space;
communicate the first instructions to the first storage space to initiate storage of the data in the first storage space; and
communicate the second instructions to a queue to be executed for storing the data in the second storage space at a subsequent time upon a predefined condition being met.

20. The system of claim 19, wherein the second storage space queue comprises a list of data storage instructions which are processed in sequence.

* * * * *